(12) United States Patent
Cho et al.

(10) Patent No.: US 10,018,327 B2
(45) Date of Patent: Jul. 10, 2018

(54) OPTICAL SHEET UNIT

(71) Applicant: LMS CO., LTD, Pyeongtaek (KR)

(72) Inventors: Sung Sik Cho, Suwon (KR); Oh Hyun Kwon, Osan (KR); Tae Jun Lee, Osan (KR); Woo Jong Lee, Osan (KR); Hee Jeong Kim, Osan (KR); Jee Hong Min, Seongnam (KR); Young Il Kim, Seongnam (KR)

(73) Assignee: LMS CO., LTD, Pyeongtaek (KR)

( * ) Notice: Subject to any disclaimer, the term of this patent is extended or adjusted under 35 U.S.C. 154(b) by 328 days.

(21) Appl. No.: 14/399,965

(22) PCT Filed: May 8, 2013

(86) PCT No.: PCT/KR2013/003997
§ 371 (c)(1),
(2) Date: Nov. 10, 2014

(87) PCT Pub. No.: WO2013/168990
PCT Pub. Date: Nov. 14, 2013

(65) Prior Publication Data
US 2015/0138781 A1 May 21, 2015

(30) Foreign Application Priority Data
May 10, 2012 (KR) .................. 10-2012-0049549

(51) Int. Cl.
*F21V 7/04* (2006.01)
*F21V 5/00* (2018.01)
(Continued)

(52) U.S. Cl.
CPC ............... *F21V 5/005* (2013.01); *G02B 5/02* (2013.01); *G02B 5/0226* (2013.01);
(Continued)

(58) Field of Classification Search
CPC ......... F21V 5/005; G02B 5/02; G02B 5/0226; G02B 5/0231; G02B 5/0242;
(Continued)

(56) References Cited

U.S. PATENT DOCUMENTS

| | | | |
|---|---|---|---|
| 5,831,774 A * | 11/1998 | Toshima | G02B 5/0231 359/452 |
| 8,894,263 B2 * | 11/2014 | Yeom | B05D 5/06 362/246 |
| 2006/0290253 A1 * | 12/2006 | Yeo | G02B 5/0226 313/116 |

FOREIGN PATENT DOCUMENTS

| JP | 2006-208869 A | 8/2006 |
|---|---|---|
| KR | 10-2006-0057984 A | 5/2006 |

(Continued)

*Primary Examiner* — Jason Moon Han
(74) *Attorney, Agent, or Firm* — Patent Office of Dr. Chung Park

(57) ABSTRACT

The present invention may relate to an optical sheet unit. According to an embodiment of the present invention, disclosed is an optical sheet unit comprising: a diffusion sheet for diffusing incident light such that the light can be uniformly emitted; a prism sheet unit arranged at the position facing the diffusion sheet to concentrate the light incident from the diffusion sheet; and a bonding layer formed between the prism sheet unit and the diffusion sheet to bond the entire surfaces of the prism sheet unit and the diffusion sheet facing each other.

13 Claims, 5 Drawing Sheets

(51) Int. Cl.
    *G02B 5/02*         (2006.01)
    *G02B 5/04*         (2006.01)
    *G02F 1/1335*     (2006.01)

(52) U.S. Cl.
    CPC ......... *G02B 5/0231* (2013.01); *G02B 5/0242* (2013.01); *G02B 5/0278* (2013.01); *G02B 5/045* (2013.01); *G02F 2001/133607* (2013.01)

(58) Field of Classification Search
    CPC . G02B 5/0278; G02B 5/045; G02F 1/133504; G02F 2001/133507; G02F 2001/133607
    USPC ....................... 362/97.1–97.4, 607, 618–620
    See application file for complete search history.

(56) References Cited

FOREIGN PATENT DOCUMENTS

| | | |
|---|---|---|
| KR | 10-2007-0021376 A | 2/2007 |
| KR | 10-1118634 B1 | 3/2012 |

* cited by examiner

[FIG. 1]
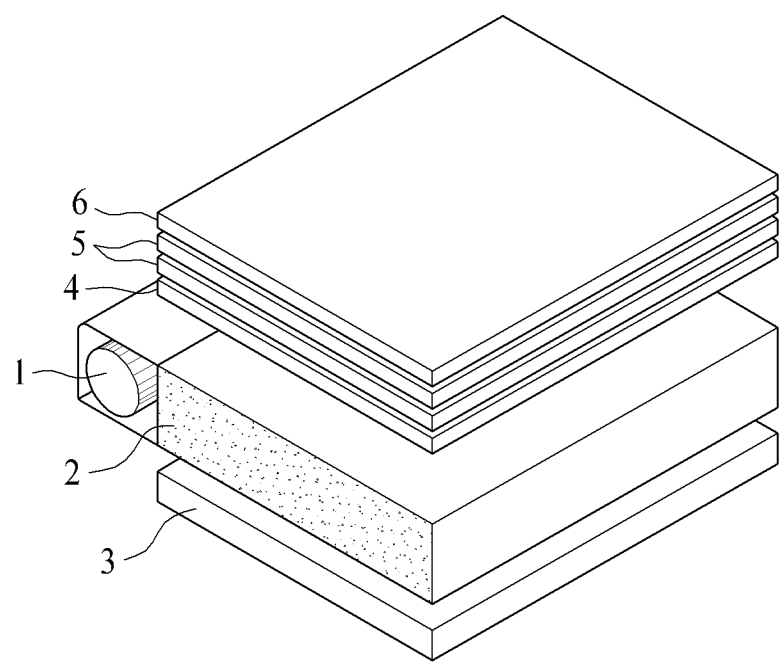

[FIG. 2]
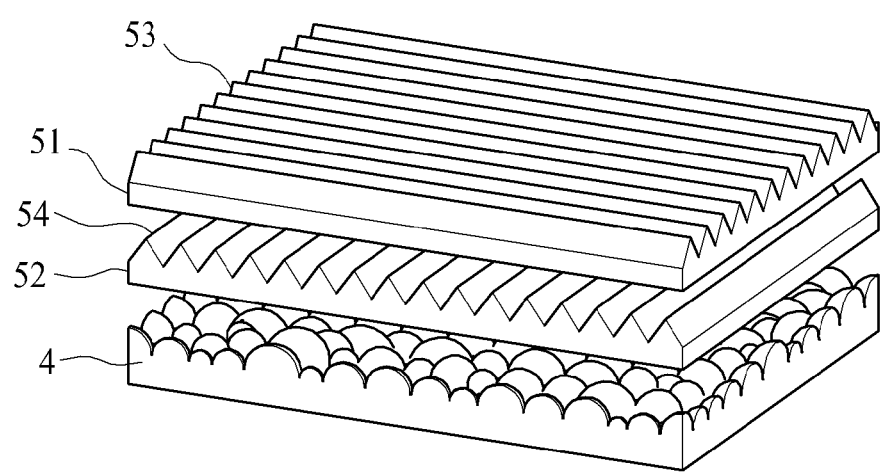

[FIG. 3]
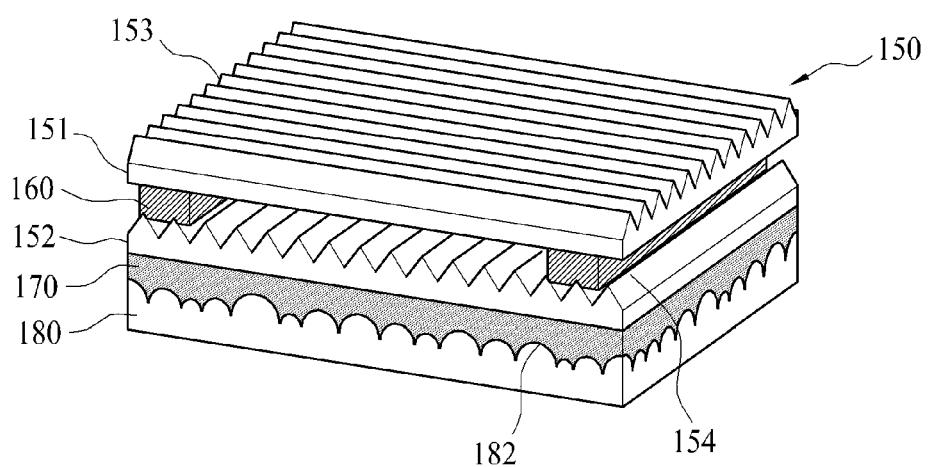

[FIG. 4]
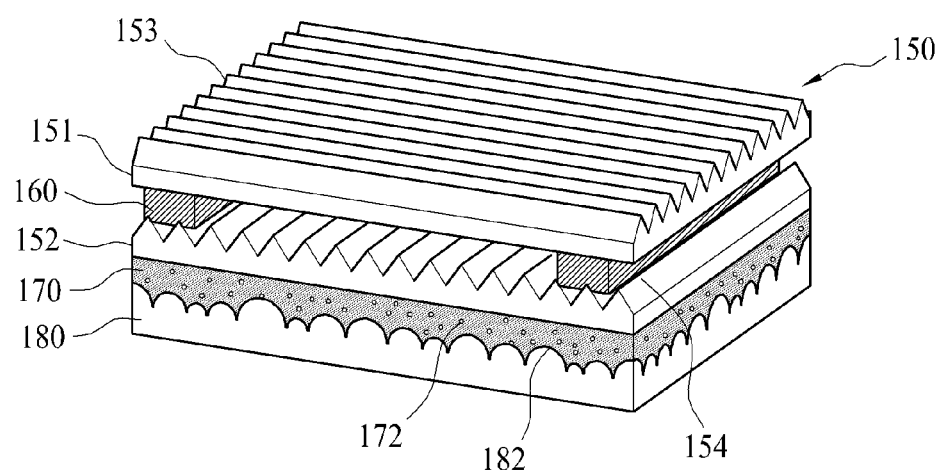

[FIG. 5]
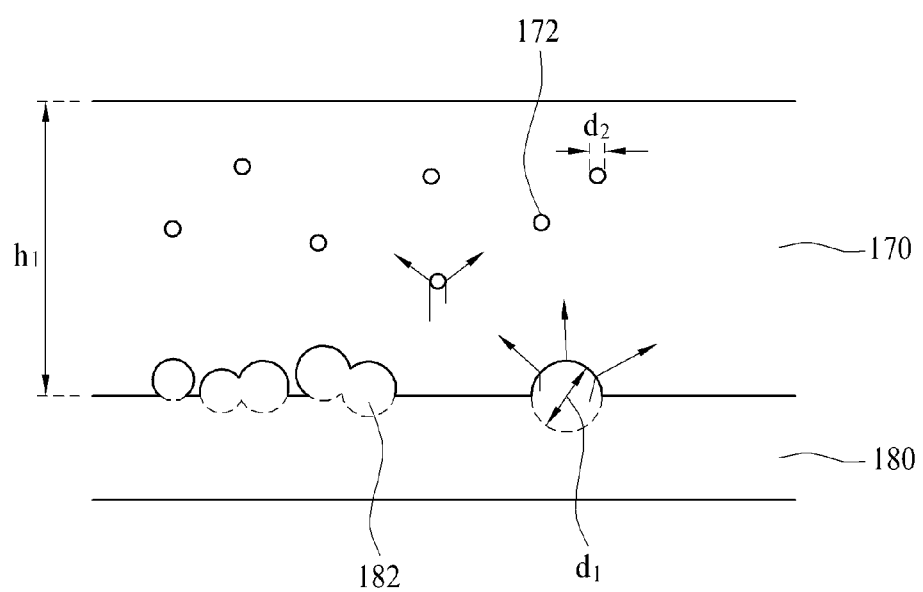

OPTICAL SHEET UNIT

CROSS-REFERENCE TO PRIOR APPLICATIONS

This application is a national Stage Patent Application of PCT International Patent Application No. PCT/KR2013/003997, filed on May 08, 2013 under 35 U.S.C. §371, which claims priority of Korean Patent Application No. 10-2012-0049549, filed on May 10, 2012, which are all hereby incorporated by reference in their entirety.

FIELD

The present invention relate to an optical sheet unit, more particularly, to an optical sheet unit which can be easily assembled as various optical sheets are integrated.

BACKGROUND

Recently, a flat display panel, in particular, a liquid crystal display, is widely used.

Generally, unlike a conventional cathode ray tube (CRT), the liquid crystal display (LCD) may require a back light module that provides light uniformly to an entire screen.

FIG. 1 is a perspective view of deal drawing illustrating a back light module of related art.

As shown in FIG. 1, in the back light module of related art, a lamp 1 which is a linear light source and a lamp reflecting plate that reflects light of the lamp 1 may be disposed in a side of a light guide plate 2 that converts the light from the lamp 1 into a surface light source, and a reflection sheet 3 to prevent a light leakage may be disposed in a lower portion of the light guide plate 2.

In addition, a diffusion sheet 4 to uniformly diffuse light may be disposed in an upper portion of the light guide plate 2, and a prism sheet unit 5 that has a plurality of linear prisms of triangle shape protruded in an upward direction to concentrate the diffused light may be placed on the diffusion sheet 4. The prism sheet unit 5 in which the plurality of linear prisms are arranged may concentrate light, and a protection sheet 6 to prevent a defect such as a scratch of the prism or an impaction of foreign substance may be disposed in an upper portion of the prism sheet unit 5.

In addition, as shown in FIG. 2, the prism sheet unit 5 may be configured of two sheets of a first prism sheet 51 and a second prism sheet 52. A plurality of prisms 53 may be arranged in parallel on one surface of the first prism sheet 51, and a plurality of prisms 54 may be arranged on one surface of the second prism sheet 52 in a perpendicular direction to the prisms 53 of the first prism sheet 51 so that light in a different direction may be concentrated to enhance a light collection efficiency.

However, as shown in FIG. 1, in the back light module of related art, since two prism sheets 51, 52 and the diffusion sheet 4 are provided as a separate product, each sheet should be assembled in a separate frame or housing when it is assembled.

Accordingly, a man hour may be increased, and a possibility of generation of assembly defect may be increased as the man hour is increased. In addition, as a gap is generated between the two prism sheets and the diffusion sheet, a total thickness may be increased.

DETAILED DESCRIPTION OF THE PRESENT INVENTION

Technical Problem

To solve those disadvantages, an object of the present invention is to provide an optical sheet unit which can be easily assembled due to a reduction of man hour by integrating each optical sheet, and may have a smaller total thickness and minimize a possibility of a generation of defect.

Technical Solution

To achieve these objects and other advantages, in an embodiment of the present invention, an optical sheet unit includes a diffusion sheet for diffusing incident light such that the light can be uniformly emitted; a prism sheet unit arranged at a position facing the diffusion sheet to concentrate the incident light from the diffusion sheet; and a bonding layer formed between the prism sheet unit and the diffusion sheet to bond entire surfaces that the prism sheet unit and the diffusion sheet mutually face.

The prism sheet unit includes a first prism sheet having a plurality of prisms arranged in one surface of the first prism sheet; and a second prism sheet, which is bonded to one surface or the other surface of the first prism sheet, having a plurality of prisms arranged in a direction perpendicular to a direction in which the prism of the first prism sheet is formed.

The bonding layer is filled in an entire space between the prism sheet unit and the diffusion sheet.

The bonding layer has a refractive index different from the refractive index of the diffusion sheet.

A difference of refractive index between the bonding layer and the diffusion sheet is 0.05 or more.

A bead to scatter and diffuse light emitted from the diffusion sheet is included in the inside of the bonding layer.

The bead has a refractive index ranging from 1.4 to 2.0.

The bead has a diameter ranging from 100 nm to 10 nm.

A content of the bead in the bonding layer is 50% of a weight of bonding layer or less.

A plurality of protuberances are formed on a surface that faces the prism sheet unit of the diffusion sheet to diffuse light emitted from the diffusion sheet.

A diameter of the protuberance is 50 μm or less.

The protuberance has a refractive index ranging from 1.5 to 1.7.

Scattering of the diffusion sheet is 50% or more.

A thickness of the bonding layer is 100 μm or less.

Advantageous Effects

As a result, there may be an effect of an optical sheet unit according to the present invention.

First, each optical sheet may be integrated to decrease man hour and thus may be easily assembled, such that possibility of defect generation may be minimized and productivity may be increased.

Second, a thickness may be reduced in comparison with a conventional method of fixing each optical sheet to each of frame or housing.

Third, a bead to diffuse light may be included in the inside of a bonding layer such that a diffusion efficiency of light may be increased.

BRIEF DESCRIPTION OF THE DRAWINGS

FIG. 1 is a perspective view of deal drawing illustrating a back light module of related art;

FIG. 2 is a perspective view of enlarged prism sheet unit and diffusion sheet of FIG. 1;

FIG. 3 is a perspective view of enlarged prism sheet unit and diffusion sheet according to an embodiment of the present invention;

FIG. 4 is a perspective view of enlarged prism sheet unit and diffusion sheet according to another embodiment of the present invention; and FIG. 5 is a cross-sectional diagram illustrating enlarged bonding layer and diffusion sheet of FIG. 4.

DETAILED DESCRIPTION OF THE PRESENT INVENTION

Reference may now be made in detail to specific embodiments, examples of which may be illustrated in the accompanying drawings. Wherever possible, same reference numbers may be used throughout the drawings to refer to the same or like parts.

Hereinafter, it is illustrated that an optical sheet unit according to an embodiment of the present invention is applied to a back light module of a display apparatus such as LCD or LED. However, the present invention is not limited thereto, and the optical sheet unit may be independently used and able to be applied to other apparatus.

The optical sheet unit according to an embodiment of the present invention, as shown in FIG. 3, may include a prism sheet unit 150, a diffusion sheet 180, and a bonding layer 170.

Hereinafter, based on FIG. 3, a direction in which the diffusion sheet 180 faces the prism sheet unit 150 is referred to as one side, and the opposite direction is referred to as the other side. Accordingly, a surface that faces the diffusion sheet 180 of the prism sheet unit 150 may be the other surface, and the opposite surface may be one surface. In addition, in the diffusion sheet 180, a surface that faces the diffusion sheet 180 may be one surface, and the opposite surface may be the other surface.

In addition, although not shown in drawing, a light guide plate (not shown) and a light source (not shown) may be disposed in the other side of the diffusion sheet 180.

The prism sheet unit 150 is an element that concentrates light, and may include a first prism sheet 151 and a second prism sheet 152.

In one surface of the first prism sheet 151, a plurality of fine prisms 153 may be arranged in a certain direction in parallel.

In addition, the second prism sheet 152 may be provided in the other side of the first prism sheet 151. In one surface of second prism sheet 152, a plurality of prisms 154 may be arranged in a direction perpendicular to a direction in which the prism 153 of the first prism sheet 151 is formed.

In the meantime, the first prism sheet 151 and the second prism sheet 152 may be adhered to each other.

That is, as shown in FIG. 3, the first prism sheet 151 and the second prism sheet 152 may be adhered by using a separate adhesive 160. FIG. 3 illustrates an example in which a part of the first prism sheet 151 and the second prism sheet 152 is mutually adhered by using the adhesive 160. In addition, entire surfaces that the first prism sheet 151 and the second prism sheet 152 mutually face may be adhered. Alternatively, without using a separate adhesive, the first prism sheet 151 and the second prism sheet 152 may be made of material having adhesive property and be mutually adhered.

In addition, in the embodiment of the present invention, it is illustrated that the prism sheet unit 150 is configured of two sheets of the first prism sheet 151 and the second prism sheet 152. However, the present invention is not limited to the above mentioned number of the prism sheet, and the prism sheet unit 150 may be configured of a single prism sheet, or may be configured of three or more prism sheets.

The diffusion sheet 180 is an element to diffuse incident light from a light source (not shown) and a light guide plate (not shown) so that the incident light may be uniformly emitted over the surface. As shown in FIG. 3 and FIG. 5, a plurality of protuberances 182 may be formed in one surface of the above mentioned diffusion sheet 180 that faces the prism sheet unit 150. The protuberance 182 may refract or scatter the light emitted from the diffusion sheet 180 so that a diffusion effect may be more enhanced.

Generally, the protuberance 182 may have a circular shape, and may be formed on a surface of the diffusion sheet 180. The protuberance 182 may be formed by a method of reproducing by using master, and may be a result of a dispersion of a diffusion particle, such as bead, dispersed into polymer resin. In addition, a part of diffusion particle may be buried inside of the polymer resin, and the other part may be exposed.

A size (diameter: d1) of the protuberance 182 may be 50 μm or less, and may have a refractive index ranging from 1.5 to 1.7.

In the meantime, the protuberance 182 may be formed of the same material as the diffusion sheet 180, or may be formed of material such as a poly methyl methacrylate (PMMA) which is a type of acrylic, a transparent urethane, and the like.

In addition, scattering (Haze) of the diffusion sheet 180 may be 50% or more.

The bonding layer 170 may be formed between the prism sheet unit 150 and the diffusion sheet 180, and entire surfaces that the prism sheet unit 150 and the diffusion sheet 180 face may be adjoined mutually.

That is, the prism sheet unit 150 and the diffusion sheet 180 may be adjoined to be integrated by the bonding layer 170.

In the embodiment of the present invention, since the diffusion sheet 180 is disposed in the other side of the second prism sheet 152, the bonding layer 170 may be formed between the second prism sheet 152 and the diffusion sheet 180.

The bonding layer 170 may be filled into an entire space between the prism sheet unit 150 and the diffusion sheet 180.

Here, the filling of the bonding layer 170 into an entire space between the prism sheet unit 150 and the diffusion sheet 180 means that the space between the prism sheet unit 150 and the diffusion sheet 180 is fully filled without any void.

The size and height of the protuberance 182 of the diffusion sheet 180 may be irregular. Accordingly, when the prism sheet is disposed on the diffusion sheet 180 without the bonding layer 170, a flexure is generated in the prism sheet. Thus, it is difficult to concentrate light uniformly. However, when the bonding layer is used as in the present invention, the generation of a flexure of prism sheet due to an irregular height of the diffusion sheet may be prevented.

The bonding layer 170 may be formed of material such as a poly methyl methacrylate (PMMA) which is a type of acrylic, a transparent urethane, and the like, and may have a refractive index different from the refractive index of the diffusion sheet 180.

That is, the diffusion sheet 180 may have a material having a high refractive index ranging from 1.5 to 1.75, and the bonding layer 170 may use a material having a refractive index ranging from 1.4 to 1.5 which is relatively lower than that of the diffusion sheet 180.

Obviously, it is possible that the bonding layer 170 may use a material having a refractive index which is relatively higher than that of the diffusion sheet 180. Furthermore, the bonding layer 170 may use a material having a refractive index which is lower or higher than that of the diffusion sheet 180, and, in this case, the refractive index of the bonding layer 170 and the refractive index of the diffusion sheet 180 may be 0.05 or more.

At this time, it is preferable that bonding strength of the bonding layer 170 is 10 gf/mm. In an experiment of an applicant of the present invention, a phenomenon of delamination is generated at the time of cutting work during a process of manufacturing an optical sheet in a lower bonding strength compared to the above mentioned bonding strength. Obviously, it is not limited thereto, and, if necessary, more higher bonding strength may be applied or the bonding strength lower than this may be applied.

Here, the bonding strength indicates a power required to take off the prism sheet unit 150 and the diffusion sheet 180 by pulling them in an opposite direction in parallel.

Accordingly, in order to reduce a total thickness while maintaining a minimum bonding strength, the thickness (h1) of the bonding layer 170 may be maintained to be 100 μm or less. Obviously, since the bonding strength is also increased as the thickness of the bonding layer 170 is increased, those skilled in the art may determine an appropriate thickness in consideration of a total thickness.

Hence, the light emitted from the diffusion sheet 180 may be diffused and refracted while passing through the bonding layer 170 having a refractive index different from the refractive index of the diffusion sheet 180.

Hereinafter, an optical sheet unit according to another embodiment of the present invention is illustrated.

In this embodiment of the present invention, the same part as the above mentioned embodiment is omitted.

As shown in FIG. 4, the optical sheet unit according to another embodiment of the present invention may include a prism sheet unit 150, a bonding layer 170, and a diffusion sheet 180.

At this time, since the prism sheet unit 150 and the diffusion sheet 180 are substantially the same as the above mentioned embodiment, a detailed description thereof is omitted, and, hereinafter, the bonding layer 170, which is a part different from the above mentioned embodiment, is mainly illustrated.

Properties such as material, thickness, and refractive index, or the like of the bonding layer 170 is the same as the above mentioned embodiment, and the bonding layer 170 according to this embodiment may further include a bead 172 therein compared to the bonding layer of the above mentioned embodiment.

Inside of the bonding layer 170, as shown in FIG. 4 and FIG. 5, the bead 172 may be provided. As described above, when the bead 172 is provided in the inside of the bonding layer 170, the incident light to the bonding layer 170 from the diffusion sheet 180 is refracted first by the bonding layer 170, and then, may be reflected or refracted and diffused by the bead 172 to enhance a diffusion effect much more such that luminance may be increased.

The bead 172 may be made of acrylic-related material or made of material such as aluminium oxide ($Al_2O_3$), zirconia ($ZrO_2$), titanium dioxide ($TiO_2$), or the like, and may have a diameter (d2) ranging, approximately, from 100 nm-10 nm. In this case, when the size of the particle is too large, a pattern of the particle may be shown by the light emitted from the prism sheet unit, such that an overall uniformity may be lowered.

In addition, it may have a refractive index ranging from 1.4~2.0.

In addition, it is preferable that the content of the bead 172 in the bonding layer is 50% of the total weight of bonding layer or less. When the content of the bead 172 is 50% or more, it was seen that luminance is rather decreased.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An optical sheet unit comprising:
    a diffusion sheet for diffusing incident light such that the light can be uniformly emitted;
    a prism sheet unit arranged at a position facing the diffusion sheet to concentrate the incident light from the diffusion sheet; and
    a bonding layer formed between the prism sheet unit and the diffusion sheet to bond entire surfaces that the prism sheet unit and the diffusion sheet mutually face,
    wherein the prism sheet unit comprises a first prism sheet having a plurality of prisms arranged in one surface of the first prism sheet, a second prism sheet, which is bonded to the other surface of the first prism sheet, having a plurality of prisms arranged in a direction perpendicular to a direction in which the prism of the first prism sheet is formed and an adhesive formed between the first prism sheet and the second prism sheet so that the first prism sheet and the second prism sheet are mutually adhered,
    wherein the adhesive is disposed on only both side portions of the first prism sheet and the second prism sheet.

2. The optical sheet unit according to claim 1, wherein the bonding layer is filled in an entire space between the prism sheet unit and the diffusion sheet.

3. The optical sheet unit according to claim 1, wherein the bonding layer has a refractive index different from the refractive index of the diffusion sheet.

4. The optical sheet unit according to claim 3, wherein a difference of refractive index between the bonding layer and the diffusion sheet is 0.05 or more.

5. The optical sheet unit according to claim 1, wherein a bead to scatter and diffuse light emitted from the diffusion sheet is included in the inside of the bonding layer.

6. The optical sheet unit according to claim 5, wherein the bead has a refractive index ranging from 1.4 to 2.0.

7. The optical sheet unit according to claim 5, wherein the bead has a diameter ranging from 100 nm to 10 nm.

8. The optical sheet unit according to claim 5, wherein a content of the bead in the bonding layer is 50% of a weight of bonding layer or less.

9. The optical sheet unit according to claim 1, wherein a plurality of protuberances are formed on a surface that faces the prism sheet unit of the diffusion sheet to diffuse light emitted from the diffusion sheet.

10. The optical sheet unit according to claim 9, wherein a diameter of the protuberance is 50 μm or less.

11. The optical sheet unit according to claim 9, wherein the protuberance has a refractive index ranging from 1.5 to 1.7.

12. The optical sheet unit according to claim 1, wherein scattering of the diffusion sheet is 50% or more.

13. The optical sheet unit according to claim 1, wherein a thickness of the bonding layer is 100 μm or less.

* * * * *